(12) United States Patent
Murata

(10) Patent No.: US 7,499,735 B2
(45) Date of Patent: Mar. 3, 2009

(54) MOBILE STATION WITH SOUND SPEAKER

(75) Inventor: Yukio Murata, Saitama (JP)

(73) Assignee: NEC Corporation, Tokyo (JP)

( * ) Notice: Subject to any disclaimer, the term of this patent is extended or adjusted under 35 U.S.C. 154(b) by 625 days.

(21) Appl. No.: 11/092,668

(22) Filed: Mar. 30, 2005

(65) Prior Publication Data

US 2005/0217926 A1    Oct. 6, 2005

(30) Foreign Application Priority Data

Mar. 30, 2004    (JP)    ............... 2004-100463

(51) Int. Cl.
*H04M 1/00*    (2006.01)
(52) U.S. Cl. ............... 455/575.1; 455/90.3; 379/433.02
(58) Field of Classification Search ............. 455/575.1, 455/575.3–575.4, 90.1–90.3; 379/433.02; 181/137, 189, 196; 381/361
See application file for complete search history.

(56) References Cited

U.S. PATENT DOCUMENTS

| | | | | |
|---|---|---|---|---|
| 5,406,038 | A * | 4/1995 | Reiff et al. ................ | 181/167 |
| 7,068,979 | B2 * | 6/2006 | Pedersen et al. ........... | 455/90.3 |
| 7,113,740 | B2 * | 9/2006 | Kuchiishi et al. .......... | 455/3.06 |
| 7,113,813 | B2 * | 9/2006 | Shimokawatoko et al. ................. | 455/575.3 |
| 7,263,391 | B2 * | 8/2007 | Sugiyama et al. ......... | 455/575.3 |
| 7,400,875 | B2 * | 7/2008 | Konno ........................ | 455/349 |
| 2002/0052216 | A1 * | 5/2002 | Song .......................... | 455/550 |
| 2003/0096632 | A1 * | 5/2003 | Kim et al. .................. | 455/550 |

FOREIGN PATENT DOCUMENTS

| | | |
|---|---|---|
| CN | 1365600 A | 8/2002 |
| CN | 1465205 A | 12/2003 |
| JP | 8-46384 A | 2/1996 |
| JP | 09-152584 | 6/1997 |
| JP | 2000-244618 A | 9/2000 |
| JP | 2000-244993 | 9/2000 |
| JP | 2001-119773 | 4/2001 |
| JP | 2001-189981 | 7/2001 |
| JP | 2001-197182 | 7/2001 |
| JP | 2001-308975 A | 11/2001 |
| JP | 2002-536916 A | 10/2002 |
| JP | 2003-087381 A | 3/2003 |
| JP | 2003-111194 | 4/2003 |
| JP | 2003-244787 | 8/2003 |
| WO | WO-01/76342 A1 | 10/2001 |
| WO | WO-03/007651 A1 | 1/2003 |

* cited by examiner

*Primary Examiner*—Sharad Rampuria
(74) *Attorney, Agent, or Firm*—Dickstein, Shapiro, LLP.

(57) ABSTRACT

In a mobile station, a casing has a sound hole formed in a front wall portion thereof, and an inner frame is contained in the casing. A sound duct is integrally formed with the inner frame, and a wiring board is contained in the casing and arranged In the vicinity of a bottom wall portion of the casing. A sound speaker is mounted on a top surface of the wiring board such that a sound emitting face of the sound speaker is directed to the front wall portion of the casing. The sound emitting face of the sound speaker is connected to the sound hole through the sound duct so that a sound is guided from the sound speaker to the sound hole.

13 Claims, 10 Drawing Sheets

MOBILE STATION WITH SOUND SPEAKER

BACKGROUND OF THE INVENTION

1. Field of the Invention

The present invention relates to a mobile station, such as a mobile phone terminal, a personal digital assistant (PDA), a note-type personal computer or the like, which is provided with a sound speaker.

2. Description of the Related Art

A mobile station, such as a mobile phone terminal, a personal digital assistant (PDA), a note-type personal computer or the like, contains a sound speaker in a casing of the mobile station to emit sounds for a moving picture, a game or the like. Also, when the sound speaker is used as a music sound speaker, it must have a relatively large size before a high quality sound can be obtained. In a case where the mobile station is a mobile phone terminal, the sound speaker is further used as a ringer when an incoming call is received. Namely, although a casing of the mobile phone terminal is relatively small, it must be provided with the sound speaker plus a talking speaker for a telephone call.

On the other hand, recently, there is a trend in mobile stations toward miniaturization. Thus, it is necessary to effectively arrange various electronic parts or elements before the miniaturization of the mobile station can be achieved. For this reason, conventionally, the sound speaker is frequently contained in the casing of the mobile station such that a sound emitting face of the sound speaker is in contact with an inner wall face of a bottom wall portion of the casing. In this case, it is difficult or impossible to deliver a sufficient volume of sound from the sound speaker to a user or listener. Especially, a high frequency sound cannot be delivered from the sound speaker to the user or listener because the high frequency sound exhibits a strong directivity.

Therefore, it is proposed that a sound hole is formed in a side wall portion or a front wall portion of the casing, and that the sound hole is connected to the sound emitting face of the sound speaker through a sound duct, as disclosed in, for example, JP-A-2001-119773, JP-A-2001-197182 and JP-A-2001-189981. With these arrangements, it is possible to deliver a sufficient volume of sound from the sound speaker to a user or listener. Nevertheless, the connection of the sound hole and the sound emitting face of the sound speaker through the sound duct is very troublesome, resulting in an increase in assembly cost of the mobile station.

On the other hand, there are various sound speakers which are used in mobile stations, as disclosed in, for example, JP-A-2000-244993, JP-A-2003-111194 and JP-A-2003-244787. In each of these sound speakers, in order to deliver a sufficient volume of sound to a user or listener, it is necessary to form a sound hole in a side wall portion or a front wall portion of the casing, and the sound hole must be connected to the sound emitting face of the sound speaker by using a sound duct. Thus, similar to the above-mentioned cases, the connection of the sound hole and the sound emitting face of the sound speaker through the sound duct is very troublesome, resulting in an increase in assembly cost of the mobile station.

SUMMARY OF THE INVENTION

Therefore, an object of the present invention is to provide a mobile station containing a sound speaker, which is constituted such that a sufficient volume of sound can be delivered from the sound speaker to a user or listener without considerably increasing an assembly cost of the mobile station.

In accordance with the present invention, there is provided a mobile station comprising a casing having a sound hole formed in a front wall portion thereof, an inner frame contained in the casing, a sound duct integrally formed with the inner frame, a wiring board contained in the casing and arranged in the vicinity of a bottom wall portion of the casing, and a sound speaker mounted on a top surface of the wiring board such that a sound emitting face of the sound speaker is directed to the front wall portion of the casing. The sound emitting face of the sound speaker is connected to the sound hole through the sound duct so that a sound is guided from the sound speaker to the sound hole.

The sound duct may include a first sound duct section protruded from a top surface of the inner frame, and a second sound duct section protruded from the top surface of the inner frame. In this case, an end face of the first sound duct section may be abutted against and aligned with the sound emitting face of the sound speaker, and an end face of the second sound duct section may be abutted against an inner wall surface of the front wall portion of the casing so as to be aligned with the sound hole. The first sound duct section may have a larger diameter than that of the second sound duct section.

In another aspect of the present invention, the sound duct may include a first sound duct section protruded from a top surface of the inner frame, and a second sound duct section slantedly protruded from the top surface of the inner frame. In this case, an end face of the first sound duct section may be abutted against and aligned with the sound emitting face of the sound speaker, and an end face of the slantedly-protruded second sound duct section may be directed to the sound hole.

When the sound hole, the sound duct, and the sound speaker are defined as a first sound hole, a first sound duct and a first sound speaker, respectively, the mobile station may further comprise a second sound duct integrally formed with the inner frame, and a second sound speaker mounted on the top surface of the wiring board such that a sound emitting face of the second sound speaker is directed to the front wall portion of the casing. The casing may have a second sound hole formed in the front wall portion of the casing, the sound emitting face of the second sound speaker being connected to the second sound hole through the second sound duct so that a sound is guided from the second sound speaker to the second sound hole.

When the casing has an opening formed in the front wall portion thereof, the mobile station may further comprise a sound duct integrally formed with the inner frame, and a talking speaker securely attached to a lower end face of the sound duct, an upper end of the sound duct being abutted against an inner wall face of the front wall portion of the casing so as to be aligned with the opening.

When the casing is defined as a lower casing, the mobile station may further comprise an upper casing hinged to the lower casing such that the upper casing is movable between an opened position and a closed position at which the upper casing is superimposed on the lower casing. In this case, preferably, the lower casing has at least one recess formed in a front wall portion thereof so as to be opened at a side of the front wall portion of the lower casing, and the sound hole is formed in the recess.

When the wiring board is defined as a first wiring board, the mobile station may further comprise a second wiring board mounted on the inner frame. In this case, preferably, the first wiring board is defined as a main wiring board, and the second wiring is defined as a key-wiring board associated with a flexible key sheet, which has a plurality of keys securely mounted thereon. When the mobile station is constituted as a mobile phone terminal, each of the keys is defined as a dial key.

The inner frame may have at least two hooks for detachably mounting the second wiring board on the inner frame. Also, the second wiring board may have an opening formed therein, and a part of the sound duct may be extended through the opening.

BRIEF DESCRIPTION OF THE DRAWINGS

The above object and other objects will be more clearly understood from the description set forth below, with reference to the accompanying drawings, wherein.

DESCRIPTION OF THE PREFERRED EMBODIMENTS

With reference to FIGS. 1 to 4, a first embodiment of a mobile station according to the present invention will now be explained below.

Figure 1:
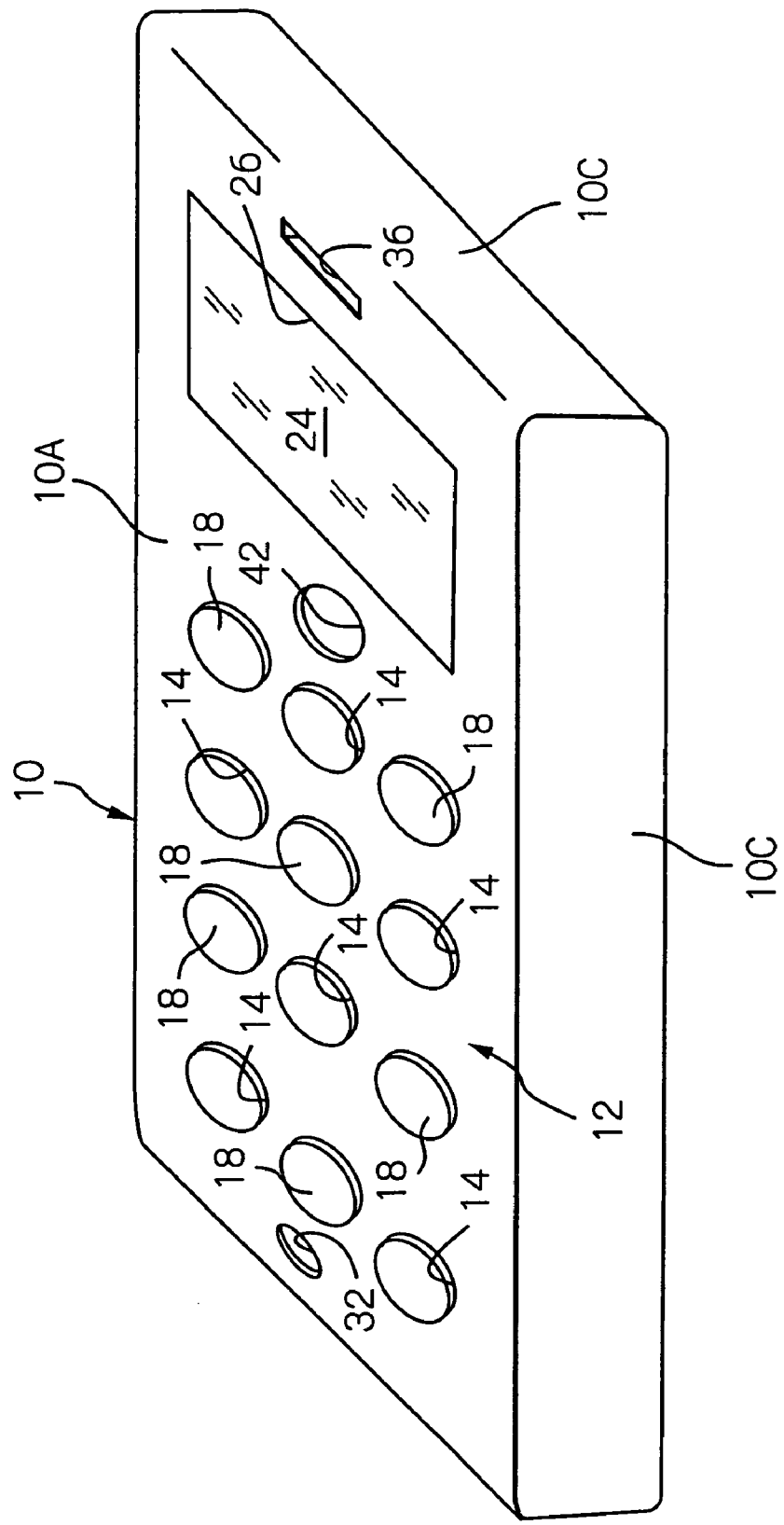
FIG. 1 is a perspective view of a first embodiment of a mobile station according to the present invention, which is constituted as a mobile phone terminal.
Figure 2:
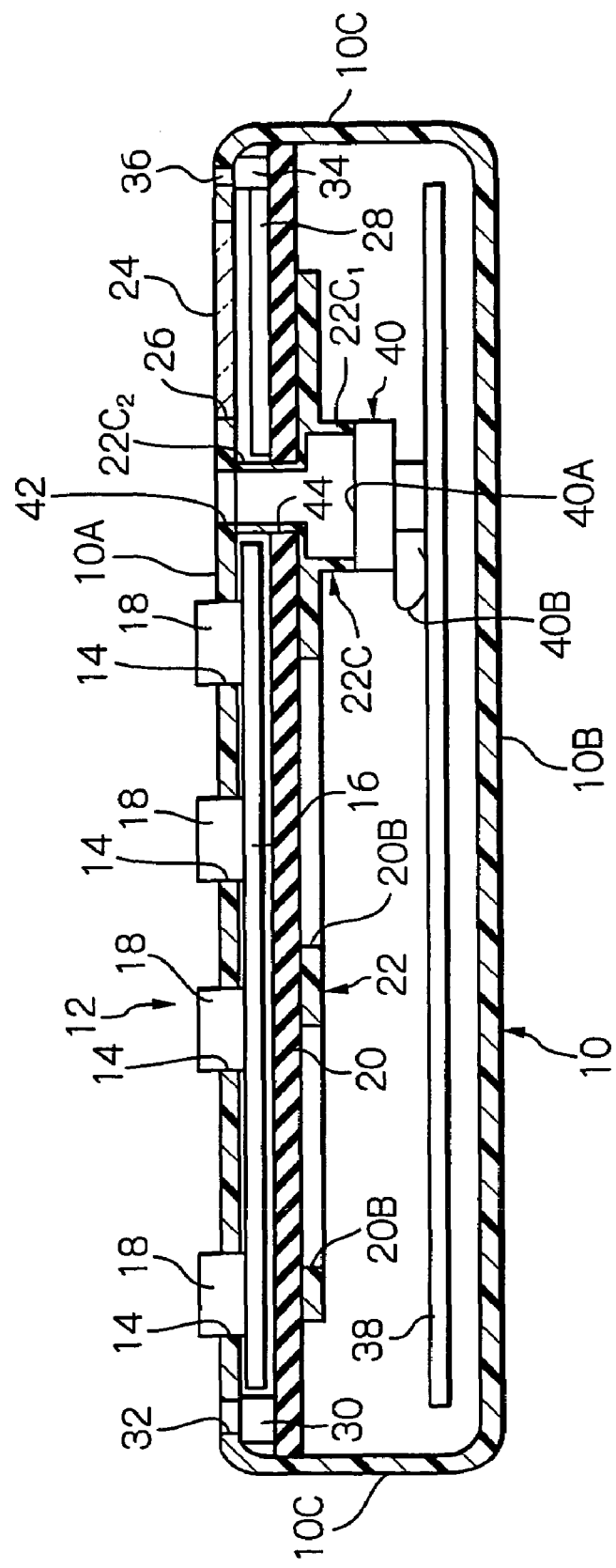
FIG. 2 is a longitudinal cross-sectional view showing an interior arrangement of the mobile phone terminal shown in FIG. 1, with a rectangular elongated casing, a key-wiring board and an inner plate-like frame being shown in the cross-sectional view.

In this first embodiment, this mobile station is constituted as a mobile phone terminal, which includes a rectangular elongated casing 10 molded from a suitable resin material. As shown in FIGS. 1 and 2, the elongated casing 10 has a rectangular front wall portion 10A, a rectangular bottom wall portion 10B (FIG. 2), and four side wall portions 10C integrally extending therebetween.

A part of an outer wall face of the front wall portion 10A is defined as a manipulation board area, generally indicated by reference 12. The elongated casing 10 has twenty openings 14 formed in the manipulation board area 12 on the front wall face 10A, and these openings 14 are arranged in substantially a matrix manner, as shown in FIG. 1.

As shown in FIG. 2, the elongated casing 10 contains a flexible key sheet 16 which has twenty dial keys 18 securely mounted on a top surface thereof, and twenty electrical conductive rubber pads (not shown) formed in a bottom surface of the flexible key sheet 16, with the respective dial keys 18 being aligned with the electrical conductive rubber pads. The dial keys 18 are arranged in substantially the same manner as the openings 14, and the flexible key sheet 16 is attached to an inner wall face of the front wall portion 10A such that each of the dial keys 18 is protruded from a corresponding opening 14, as shown in FIG. 1.

Note, in FIG. 2, although the flexible key sheet 16 is exaggeratedly shown for the sake of convenience of illustration, in reality, it is very fine.

Also, as shown in FIG. 2, the elongated casing 10 contains a key-wiring board 20 detachably mounted on a top surface of an Inner plate-like frame 22, which is suitably supported by the elongated casing 10 at an interior thereof. Similar to the elongated casing 10, the key-wiring board 20 is molded from a suitable resin material.

Figure 3:
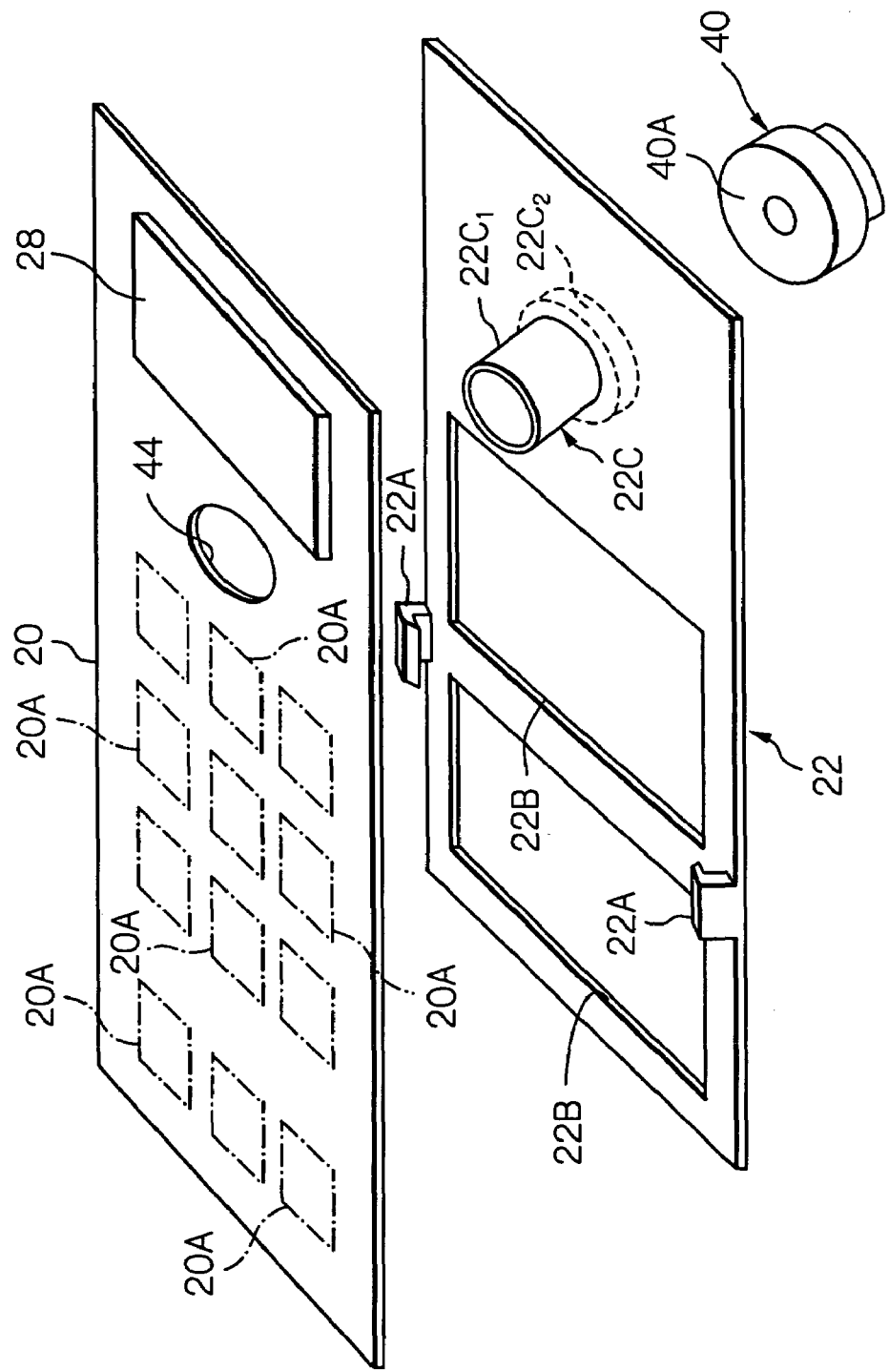
FIG. 3 is an exploded perspective view of the inner plate-like frame, a key-wiring board, and a sound speaker contained in the rectangular elongated casing, with the inner plate-like frame having a sound duct integrally formed therewith.

As shown in FIG. 3, the key-wiring board 20 has twenty switch circuit patterns 20A formed thereon, and these switch circuit patterns 20A are arranged in substantially the same manner as the openings 14. The key-wiring board 20 is mounted on the inner plate-like frame 22 such that the respective switch circuit patterns 20A are aligned with the electrical conductive rubber pads formed in the bottom surface of the flexible key sheet 16.

Figure 4:
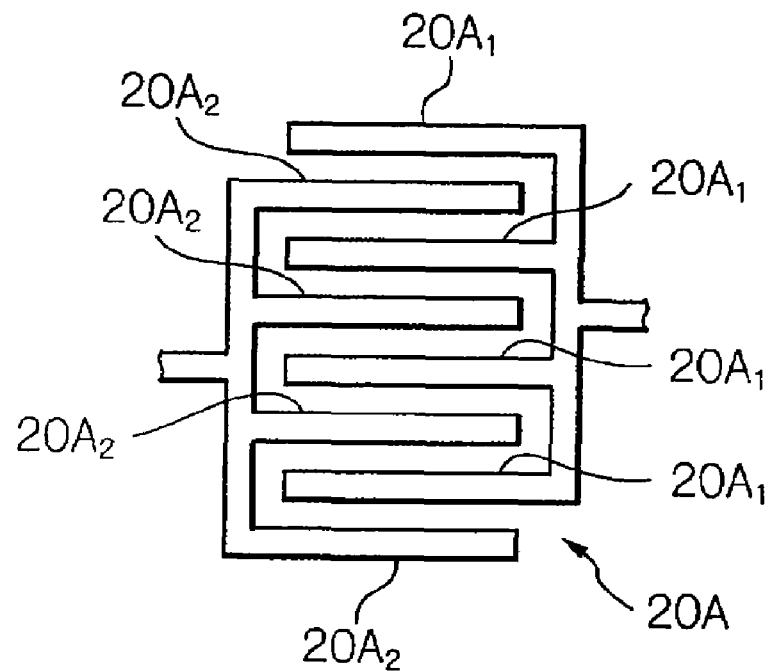
FIG. 4 is a plan view of a switch pattern circuit formed on a top surface of the key-wiring board.

Although each of the switch circuit patterns 20A is symbolically and conceptually represented as a square shown in a one-dot chain line in FIG. 3, in reality, as shown in FIG. 4, it is formed of a plurality of conductive segments $20A_1$ electrically connected to each other, and a plurality of conductive segments $20A_2$ electrically connected to each other, and the conductive segments $20A_1$ and $20A_2$ are alternately arranged so as to be close to each other.

As shown in FIG. 2, usually, the conductive rubber pads, which are formed on the bottom surface of the flexible key sheet 16 to be aligned with the dial keys 18, are apart from the respective switch circuit patterns 20A formed on a top surface of the key-wiring board 20. When each of the dial keys 18 is depressed, the conductive rubber pad aligned with is the depressed dial key 19 is pressed against and contacted with a corresponding switch circuit pattern 20A, so that an electrical connection is established between the conductive segments $20A_1$ and $20A_2$ thereof, to thereby turn ON the switch circuit pattern 20A concerned.

As best shown in FIG. 3, the inner plate-like frame 22 has a pair of hooks 22A integrally formed therewith, and the respective hooks 22A are arranged on the opposite longitudinal sides of the inner plate-like frame 22. When the key-wiring board 20 is mounted on the top surface of the inner plate-like frame 22, it is snugly engaged with the hooks 22A so as to be mechanically held therewith.

Although not shown in FIG. 2, the key-wiring board 20 is provided with various electronic parts mounted on a bottom surface thereof, and the inner plate-like frame 22 is formed with rectangular openings 22B for receiving the various electronic parts when the key-wiring board 20 is mounted on the top surface of the inner plate-like frame 22. Namely, if the rectangular openings 22B are not formed in the inner plate-like frame 22, the various electronic parts interfere with the top surface of the inner plate-like frame 22 when being mounted on the top surface of the inner plate-like frame 22.

As shown in FIGS. 1 and 2, the elongated casing 10 is provided with a transparent plate 24 which is fitted in an opening 26 formed in the front wall portion 10A, and the transparent plate 24 is aligned with a liquid crystal display (LCD) panel 28 provided on the key-wiring board 20. Namely, the transparent plate serves as a display window for observing the LCD panel 28.

As best shown in FIG. 2, a microphone 30 is mounted on the key-wiring board 20 at one end area thereof, and is aligned with an opening 32 formed in the front wall portion 10A of the elongated casing 10. Also, a talking speaker 34 is mounted on the key wiring-board at the other end area thereof, and is aligned with an opening 36 formed in the front wall portion 10A of the elongated casing 10. Note, the microphone 30 and the talking speaker 34 are omitted from the key-wiring board 20 shown in FIG. 3.

As shown in FIG. 2, the elongated casing 10 further contains a main wiring board 38 arranged in the vicinity of the bottom wall portion 10B thereof, and the main wiring board 38 is suitably supported by the elongated casing 10 at the interior thereof. A sound speaker 40 is detachably mounted on the main wiring board 38 such that a sound emitting face 40A of the sound speaker 40 is directed to the front wall portion 10A of the elongated casing 10.

According to the present invention, as shown in FIGS. 2 and 3, the inner plate-like frame 22 is provided with a sound duct 22C integrally formed therewith, the sound duct 22C includes a first sound duct section $22C_1$ protruded from the bottom surface of the inner plate-like frame 22, and a second sound duct section $22C_2$ protruded from the top surface of the inner plate-like frame 22. In this embodiment, the first sound duct section $22C_1$ has an inner diameter which is substantially equal to that of the sound emitter face 40A of the sound speaker 40, and the second sound duct section $22C_2$ is substantially equal to that of a sound hole 42 formed in the front wall portion 10A of the elongated casing 10. As is apparent from FIGS. 2 and 3, the first sound duct section $22C_1$ has a larger diameter than that of the second sound duct section $22C_2$.

The sound duct 22C is associated with the sound speaker 40. In particular, as is apparent from FIG. 2, an end face of the first duct section $22C_1$ is abutted against and aligned with the sound emitter face 40A of the sound speaker 40. On the other hand, the second sound duct section $22C_2$ is extended through an opening 44 which is formed in the key wiring-board 22, and an end face of the second sound duct section $22C_2$ is abutted against the inner wall face of the front wall portion 10A so as to be aligned with the sound hole 42.

In short, as shown in FIG. 2, the sound speaker 40 is constrained between the main wiring board 38 and the second sound duct section $22C_2$. Note, the sound speaker 40 has an electrode terminal 40B which is formed as a leaf spring, and the electrode terminal 40B is electrically connected to a part of a wiring pattern formed on the main wiring board 38 to thereby drive the sound speaker 40. Also, note, the electrode terminal 40B is omitted from the sound speaker 40 shown in FIG. 3.

As is apparent from the foregoing, according to the present invention, since the sound duct 22C is integrally formed with the inner plate-like frame 22, it is possible to position the sound duct 22C in place whenever the inner plate-like frame 22 is properly arranged in the interior of the elongated casing 10. In other words, it is unnecessary to independently assemble and incorporate the sound duct 22C in the elongated casing 10, as disclosed in JP-A-2003-119773, JP-A-2001-197182 and JP-A-2001-189981, and thus it is possible to considerably suppress an increase in assembly cost of the mobile phone terminal according to the present invention.

Figure 5:
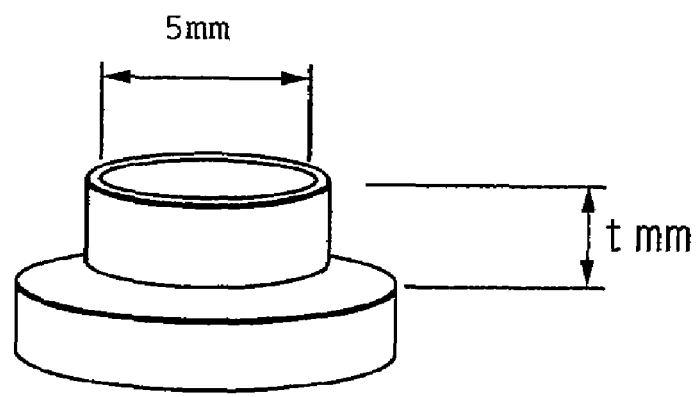
FIG. 5 is a perspective view of a sample of the sound duct produced by the inventor to show dimensions of the sample.

Some samples of the sound duct (22C) were produced by the inventor to research sound characteristics of the sound speaker 40 associated with the sound duct 22C. As shown in FIG. 5, in these samples, the second sound duct section ($22C_2$) of the sound duct (22C) had an inner diameter of 5 mm, and a length of the second sound duct section ($22C_2$) was varied among the samples. Namely, in one of the samples, the length of the second sound duct section ($22C_2$) was 0 mm; in another of the samples, the length of the second sound duct section ($22C_2$) was 2.5 mm; in yet another of the samples, the length of the second sound duct section ($22C_2$) was 5 mm; and in the remaining the sample, the length of the second sound duct section ($22C_2$) was 7.5 mm.

Figure 6:
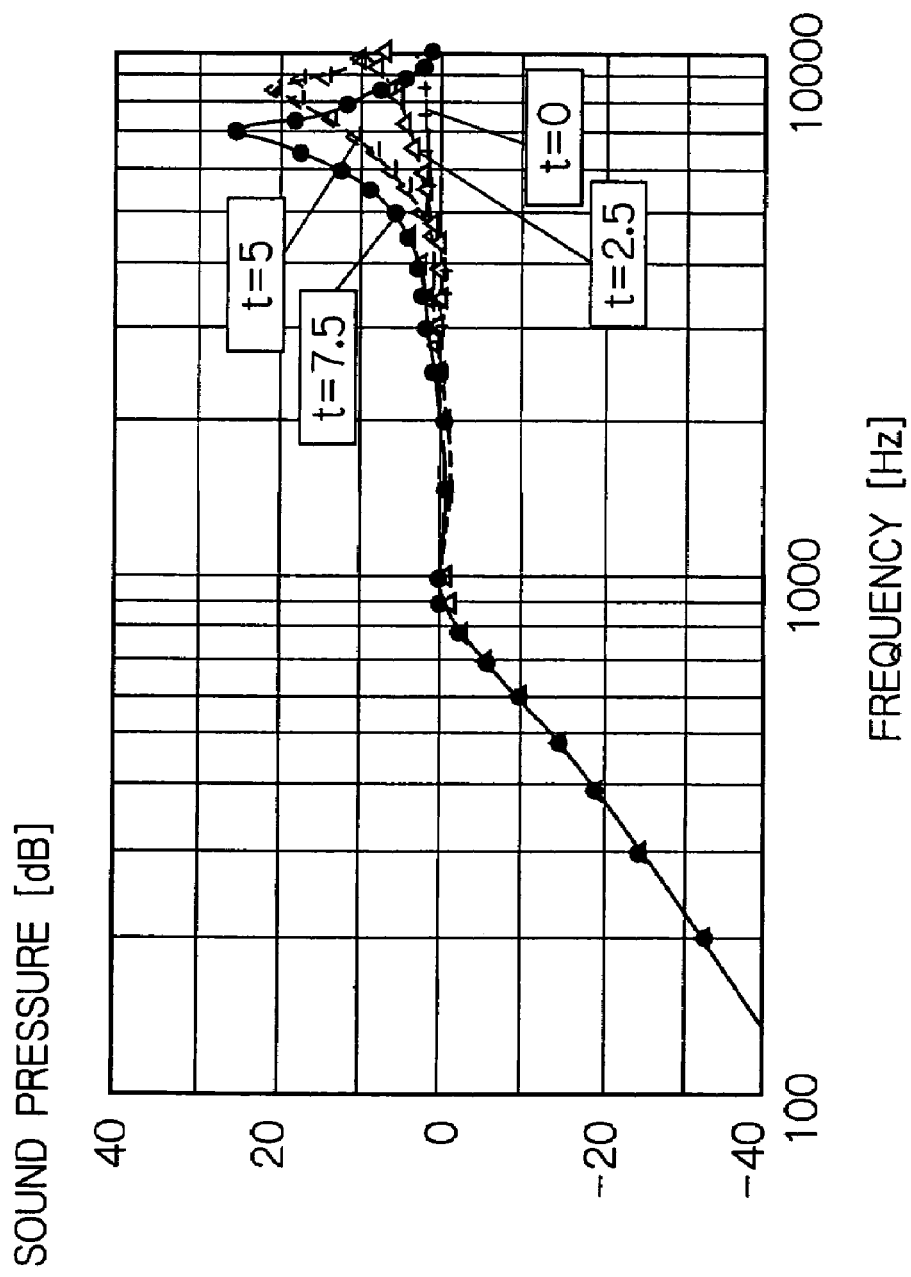
FIG. 6 is a graph showing sound characteristics when a length of a second sound duct section of the sound duct is varied.

The results of the research carried out by the inventor are shown in a graph of FIG. 6. In this graphs the abscissa represents frequency components [Hz], and the ordinate represents a sound pressure [dB]. As is apparent from the graph of FIG. 6, as the length of the second sound duct section ($22C_2$) becomes longer, high frequency components are more increased.

Figure 7:
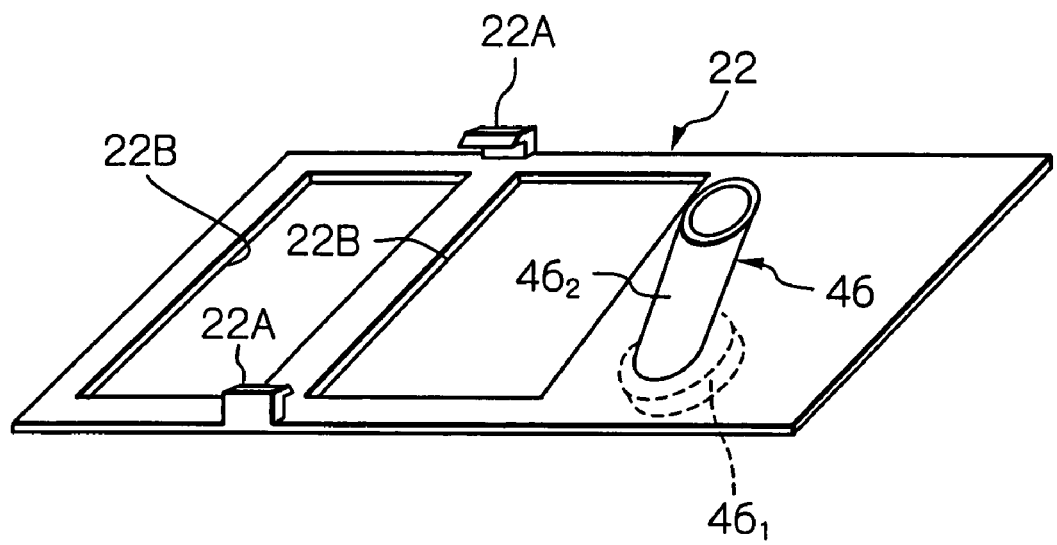
FIG. 7 is a perspective view of an inner plate-like frame which is used in a second embodiment of the mobile station according to the present invention.

FIG. 7 shows an inner plate-like frame which is used in a second embodiment of the mobile phone terminal according to the present invention. Note, in FIG. 7, the features similar to those of FIG. 3 are represented by the same references.

Similar to the above-mentioned first embodiment, in this second embodiment, a sound duct 46 is integrally formed with the inner plate-like frame 22, but it is arranged near one of the opposite longitudinal sides of the inner plate-like frame 22. The sound duct 46 includes a first sound duct section $46_1$ protruded from the bottom surface of the inner plate-like frame 22, and a second sound duct section $46_2$ slantedly protruded from the top surface of the inner plate-like frame 22 so as to be directed to a sound hole (42) formed in a front wall portion (10A) of a rectangular elongated casing (10) at a center between the opposite longitudinal sides thereof, with the first sound duct section $46_1$ having a larger diameter than that of the second sound duct section $46_2$.

Although not illustrated, an end face of the first sound duct section $46_1$ is abutted against and aligned with a sound emitting face of a sound speaker (40) mounted on a main wiring board (38), and an end face of the second sound duct section $46_2$ is abutted against an inner wall face of the front wall portion (10A) so as to be aligned with the sound hole (42).

In the second embodiment, although the sound speaker (40) is positioned in the elongated casing (10) near one of the opposite longitudinal sides thereof, it is possible to guide a sound from the sound speaker to the center sound hole (42) formed in the front wall portion (10A) of the elongated casing (10).

Figure 8:
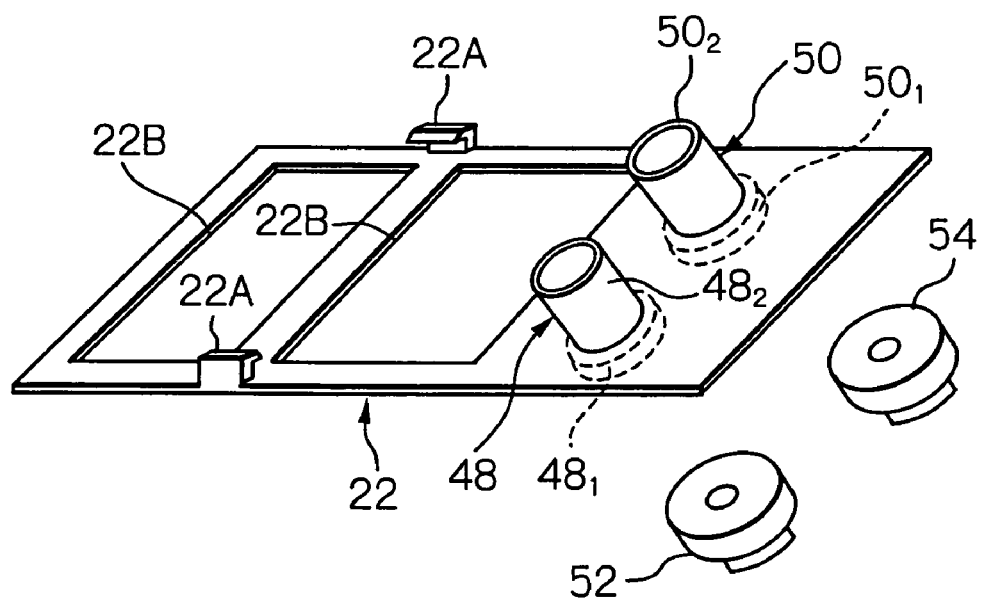
FIG. 8 is perspective view of an inner plate-like frame which is used in a third embodiment of the mobile station according to the present invention.

FIG. 8 shows an inner plate-like frame which is used in a third embodiment of the mobile phone terminal according to the present invention. Note, in FIG. 8, the features similar to those of FIG. 3 are represented by the same references.

In this third embodiment, a first sound duct 48 and a second sound duct 50 are integrally formed with the inner plate-like frame 22, and are symmetrically arranged with a longitudinal central axis of the inner plate-like frame 22.

The first sound duct 48 includes a first sound duct section $48_1$ protruded from the bottom surface of the inner plate-like frame 22, and a second sound duct section $48_2$ protruded from the top surface of the inner plate-like frame 22, with the first sound duct section $48_1$ having a larger diameter than that of the second sound duct section $48_2$.

The second sound duct 50 includes a first sound duct section $50_1$ protruded from the bottom surface of the inner plate-like frame 22, and a second sound duct section $50_2$ protruded from the top surface of the inner plate-like frame 22, with the first sound duct section $50_1$ having a larger diameter than that of the second sound duct section $50_2$.

As is apparent from FIG. 8, an end face of the first sound duct section $48_1$ is abutted against and aligned with a sound emitting face of a first sound speaker 52 mounted on a main wiring board (38), and an end face of the second sound duct section $48_2$ is abutted against an inner wall face of a front wall portion (10A) of a rectangular elongated casing (10) so as to be aligned with a first sound hole (42) formed in the front wall portion (10A).

Similarly, an end face of the first sound duct section $50_1$ is abutted against and aligned with a sound emitting face of a second sound speaker 54 mounted on the main wiring board (38), and an end face of the second sound duct section $50_2$ is abutted against the inner wall face of the front wall portion (10A) of the elongated casing (10) so as to be aligned with a second sound hole (42) formed in the front wall portion (10A).

Figure 9:
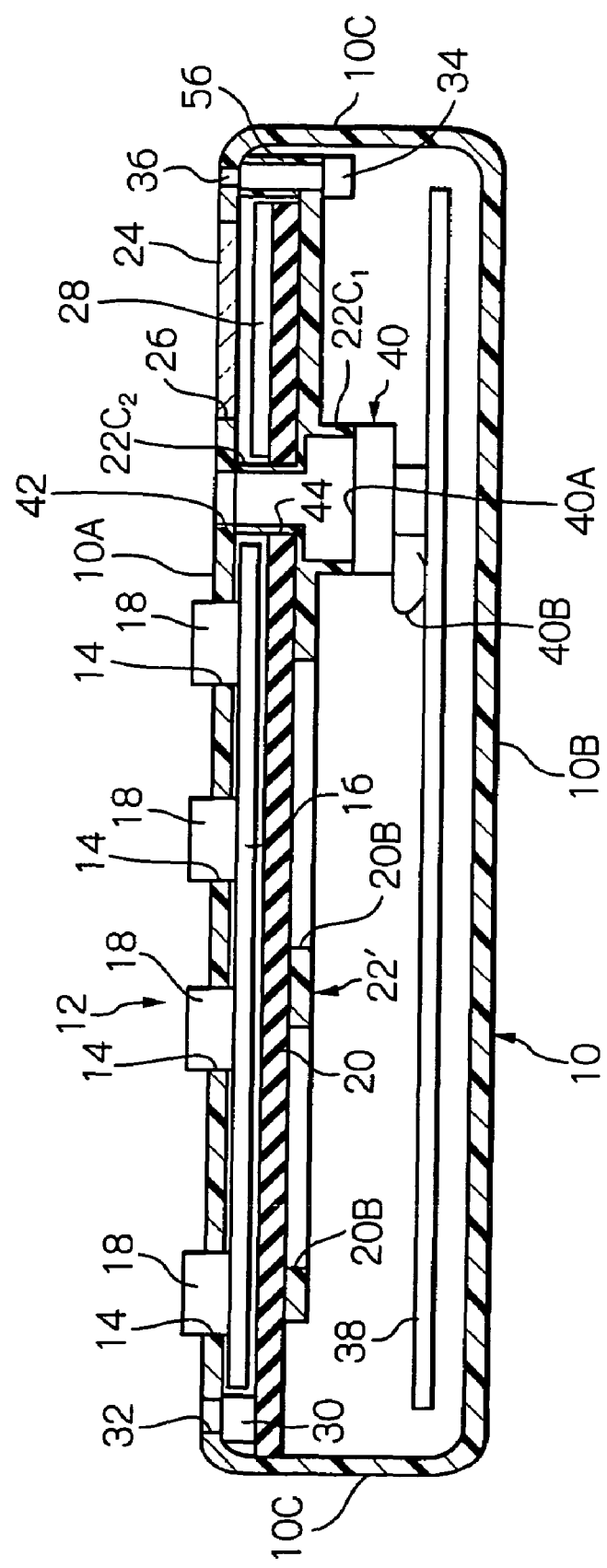
FIG. 9 is a cross-sectional view, similar to FIG. 3, showing a fourth embodiment of the mobile station according to the present invention.

FIG. 9 shows a fourth embodiment of the mobile phone terminal according to the present invention. Note, in FIG. 9, the features similar to those of FIG. 2 are represented by the same references.

In this fourth embodiment, an inner plate-like frame 22' is extended such that an end edge of the inner plate-like frame 22' reaches a location beneath an opening 36, as shown in FIG. 9, and a sound duct 56 is integrally formed with the inner plate-like frame 22' at the extended end edge thereof. A talking speaker 34 is securely attached to a lower end face of the sound duct 56, and an upper end of the sound duct 56 is abutted against an inner wall face of a front wall portion 10A of a rectangular elongated casing 10 so as to be aligned with the opening 36. Namely, the fourth embodiment is substantially identical to the above-mentioned first embodiment except that a sound is guided from the talking speaker 34 to the opening 36 through the sound duct 56.

Figure 10:
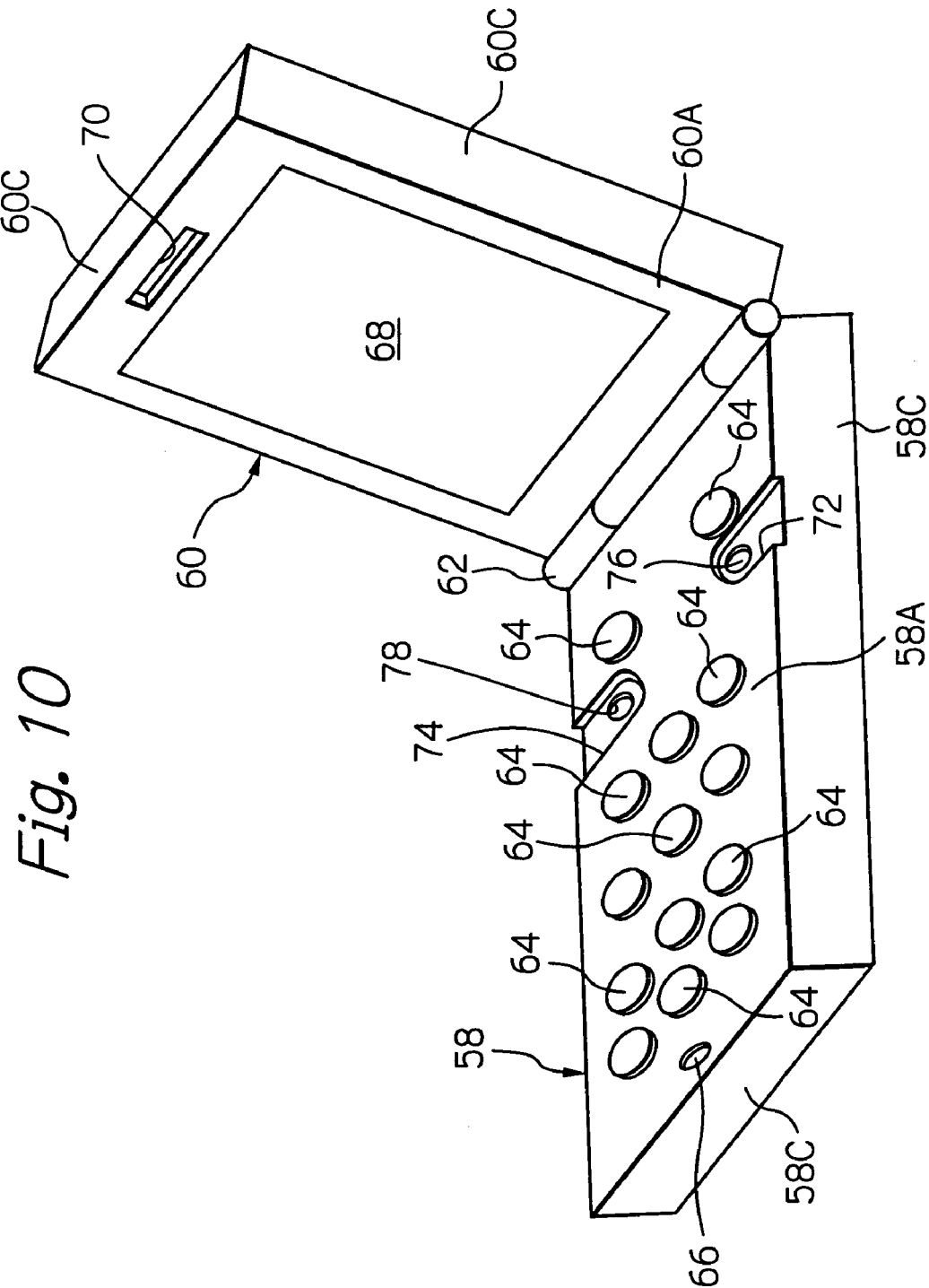
FIG. 10 is a perspective view of a fifth embodiment of the mobile station according to the present invention.

FIG. 10 shows a fifth embodiment of the mobile phone terminal according to the present invention.

In this fifth embodiment, the mobile phone terminal is constituted as a folding-type mobile phone terminal including a lower casing 58 and an upper casing 60, which are hinged to each other by a hinge shaft unit 62. Namely, the upper casing 60 is movable between an opened position as shown in FIG. 10 and a closed position at which the upper casing is superimposed on the lower casing 58.

The lower casing 58 has a rectangular front wall portion 58A, a rectangular bottom wall portion (not visible), and four side wall portions 58C integrally extending therebetween. The front wall portion 58A of the lower casing 58 is used as a manipulation board having fourteen dial keys 64 provided therein. When the upper casing 60 is at the opened position as shown in FIG. 10, the manipulation board 58A is accessible. When the upper casing 60 is at the closed position, the supper casing 60 is superimposed on the lower casing 58, and thus the manipulation board 58A is inaccessible.

Similar to the above-mentioned first embodiment, the dial keys 64 are securely mounted on atop surface of a flexible key sheet (16), and fourteen electrical conductive rubber pads are formed in a bottom surface of the flexible key sheet (16). Also, the lower casing 58 contains a key-wiring board (20) detachably mounted on a top surface of an inner plate-like frame (22), which is suitably supported by the elongated casing (58).

In this fifth embodiment, the inner plate-like frame (22) has a first sound duct (48) and a second sound duct (50) integrally formed therewith, as shown in FIG. 8, and the first and second sound ducts (48 and 50) are associated with first and second sound speakers (52 and 54)1, mounted on a main wiring board (38), in substantially the same manner as explained with reference to FIG. 2. Note, in FIG. 10, reference 66 indicates an opening for a microphone (30).

The second casing 60 includes an inner front wall portion 60A, an outer front wall portion (not visible), and four side wall portions 60C extending therebetween. As shown in FIG. 10, the second casing 60 is provided with an LCD panel 68 assembled in the inner front wall portion 60A. Note, in FIG. 10, reference 70 indicates an opening for a talking speaker (34).

The front wall portion 58A of the lower casing 58 is formed with a first recess 72 and a second recess 74. As shown in FIG. 10, the first recess 72 is opened at one of the opposite longitudinal sides of the front wall portion 58A, and the second recess 72 is opened at the other longitudinal side of the front wall portion 58A. A first sound hole 76 is formed in the first recess 72, and a second sound hole 78 is formed in the second recess 74. The first hole 76 is connected to an emitting face of the first sound speaker (52) through the first sound duct (48), and the second hole 78 is connected to an emitting face of the first sound speaker (54) through the second sound duct (50).

When the folding-type mobile phone terminal is at the closed position at which the upper casing 60 is superimposed on the lower casing 58, the respective first and second recesses 72 and 74 are closed by the inner front wall portion 60A so as to define a first sound passage and a second sound passage. Nevertheless, each of the first and second sound passages is opened at a corresponding longitudinal side of the front wall portion 58A, and thus it is possible to deliver a sufficient volume of sound from a corresponding sound speaker (52, 54) to a user or listener through a corresponding sound duct (48, 50) and a corresponding opened sound passage.

Of course, when the folding-type mobile phone terminal is at the opened position as shown in FIG. 10, it is possible to deliver a sufficient volume of sound from the first and second sound speaker (52 and 54) to the user or listener through the first and sound ducts (48 and 50).

Figure 11:
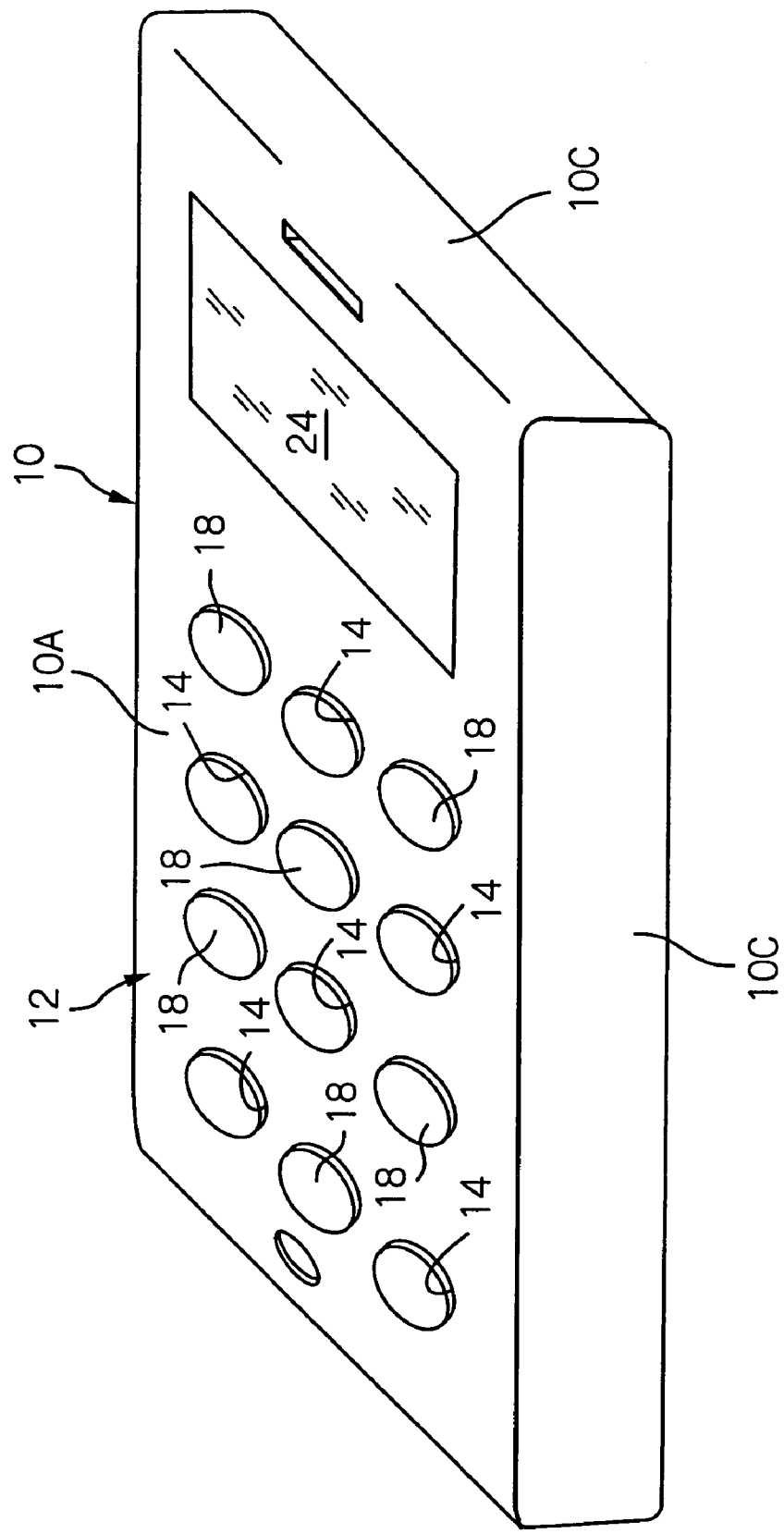
FIG. 11 is a perspective view of a prior art mobile station which is constituted as a mobile phone terminal.
Figure 12:
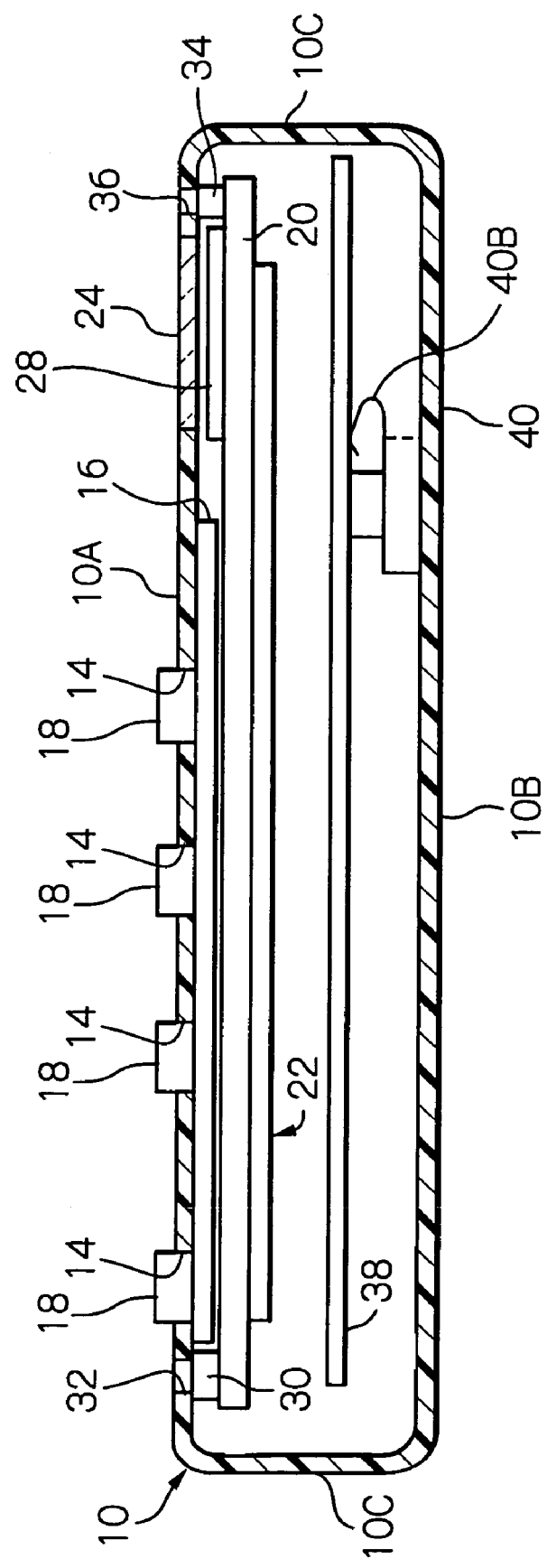
FIG. 12 is a longitudinal cross-sectional view showing an interior arrangement of the prior mobile phone terminal shown in FIG. 11, with only a rectangular elongated casing of the prior art mobile phone terminal being shown in the cross-sectional view.

FIGS. 11 and 12 show an arrangement of a prior art mobile phone terminal. Note, FIGS. 11 and 12 correspond to FIGS. 1 and 2. Also, note, in FIGS. 11 and 12, the features similar to those of FIGS. 1 and 2 are represented by the same references.

As shown in FIG. 11, in this prior art mobile phone terminal, a front wall portion 10A of a rectangular elongated casing 10 is formed with no sound hole. Also, as shown in FIG. 12, a sound speaker 40 is mounted on a bottom surface of a main wiring board 38 such that a sound emitting face of the sound speaker 40 is in contact with an inner wall surface of a bottom wall portion 10B of the elongated casing 10. Namely, the sound speaker 40 is constrained between the bottom surface of the main wiring board 38 and the inner surface of the main wiring board 38. As stated hereinbefore, with the arrangement of the prior art mobile phone terminal, it is difficult or impossible to deliver a sufficient volume of sound from the sound speaker 40 to a user or listener. Especially, a high frequency sound cannot be delivered from the sound speaker 40 to the user or listener because the high frequency sound exhibits a strong directivity.

Finally, it will be understood by those skilled in the art that the foregoing description is of preferred embodiments of the mobile station, and that various changes and modifications may be made to the present invention without departing from the spirit and scope thereof.

The invention claimed is:

1. A mobile station comprising:
   a casing having a sound hole formed in a front wall portion thereof;
   an inner frame contained in said casing;
   a sound duct integrally formed with said inner frame;
   a wiring board contained in said casing and arranged in the vicinity of a bottom wall portion of said casing; and
   a sound speaker mounted on a top surface of said wiring board such that a sound emitting face of said sound speaker is directed to the front wall portion of said casing,
   wherein the sound emitting face of said sound speaker is connected to said sound hole through said sound duct so that a sound is guided from said sound speaker to said sound hole,
   wherein said casing is defined as a lower casing, further comprising an upper casing hinged to said lower casing such that said upper casing is movable between an opened position and a closed position at which the upper casing is superimposed on the lower casing, said lower casing having at least one recess formed in a front wall portion thereof and opened at a side of said front wall portion of said lower casing, said sound hole being formed in said recess.

2. The mobile station as set forth in claim 1, wherein said sound duct includes a first sound duct section protruded from a top surface of said inner frame, and a second sound duct section protruded from the top surface of said inner frame.

3. The mobile station as set forth in claim 2, wherein an end face of said first sound duct section is abutted against and aligned with the sound emitting face of said sound speaker, and wherein an end face of said second sound duct section is abutted against an inner wall surface of the front wall portion of said casing so as to be aligned with said sound hole.

4. The mobile station as set forth in claim 2, wherein said first sound duct section has a larger diameter than that of said second sound duct section.

5. The mobile station as set forth in claim 1, wherein said sound duct (46) includes a first sound duct section protruded from a top surface of said inner frame, and a second sound duct section slantedly protruded from the top surface of said inner frame.

6. The mobile station as set forth in claim 5, wherein an end face of said first sound duct section is abutted against and aligned with the sound emitting face of said sound speaker, and wherein an end face of said slantedly-protruded second sound duct section is directed to said sound hole.

7. The mobile station as set forth in claim 1, wherein said sound hole, said sound duct, and said sound speaker are defined as a first sound hole, a first sound duct and a first sound speaker, respectively, further comprising:
   a second sound duct integrally formed with said inner frame; and
   a second sound speaker mounted on the top surface of said wiring board such that a sound emitting face of said second sound speaker is directed to the front wall portion of said casing, said casing having a second sound hole formed in the front wall portion of said casing, the sound emitting face of said second sound speaker is connected to said second sound hole through said second sound duct so that a sound is guided from said second sound speaker to said second sound hole.

8. The mobile station as set forth in claim 1, wherein said casing (10) has an opening formed in the front wall portion thereof, further comprising:
   a sound duct integrally formed with said inner frame; and
   a talking speaker securely attached to a lower end face of said sound duct, an upper end of said sound duct being abutted against an inner wall face of the front wall portion of said casing so as to be aligned with said opening.

9. The mobile station as set forth in claim 1, wherein said wiring board is defined as a first wiring board, further comprising a second wiring board mounted on said inner frame.

10. The mobile station as set forth in claim 9, wherein said first wiring board is defined as a main wiring board, and wherein said second wiring board is defined as a key-wiring board associated with a flexible key sheet, which has a plurality of keys securely mounted thereon.

11. The mobile station as set forth in claim 10, wherein said mobile station is constituted as a mobile phone terminal, each of said keys being defined as a dial key.

12. The mobile station as set forth in claim 9, wherein said inner frame has at least two hooks for detachably mounting said second wiring board on said inner frame.

13. The mobile station as set forth in claim 9, wherein said second wiring board has an opening formed therein, a part of said sound duct being extended through said opening.

* * * * *